US012615501B2

(12) United States Patent (10) Patent No.: US 12,615,501 B2
Nakamura et al. (45) Date of Patent: Apr. 28, 2026

(54) VEHICLE AND EMERGENCY NOTIFICATION SYSTEM

(71) Applicant: SUBARU CORPORATION, Tokyo (JP)

(72) Inventors: Ryota Nakamura, Tokyo (JP); Tsukasa Mikuni, Tokyo (JP); Takuya Homma, Tokyo (JP); Junichi Motoyama, Tokyo (JP); Kazuhiro Hayakawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 390 days.

(21) Appl. No.: 18/448,389

(22) Filed: Aug. 11, 2023

(65) Prior Publication Data

US 2024/0089717 A1 Mar. 14, 2024

(30) Foreign Application Priority Data

Sep. 8, 2022 (JP) .................................. 2022-143322

(51) Int. Cl.
*H04W 4/90* (2018.01)
(52) U.S. Cl.
CPC ..................................... *H04W 4/90* (2018.02)
(58) Field of Classification Search
CPC .............................................. H04W 4/90
USPC ..................................... 455/404.1
See application file for complete search history.

(56) References Cited

U.S. PATENT DOCUMENTS

| | | | | |
|---|---|---|---|---|
| 2013/0137390 A1* | 5/2013 | Sennett | .................. | H04W 4/90 455/404.1 |
| 2018/0089460 A1* | 3/2018 | Kirk | ........................ | H04W 4/40 |
| 2018/0330823 A1* | 11/2018 | Hoelzer | ................ | G16H 50/70 |
| 2020/0098271 A1* | 3/2020 | Beaurepaire | .......... | G08G 1/143 |
| 2020/0124426 A1* | 4/2020 | Beaurepaire | .......... | G06Q 10/02 |
| 2021/0076181 A1* | 3/2021 | Kim | ..................... | G08G 1/0112 |

FOREIGN PATENT DOCUMENTS

JP 2010-244167 A 10/2010

* cited by examiner

*Primary Examiner* — Qutbuddin Ghulamali
(74) *Attorney, Agent, or Firm* — Rimon P.C.

(57) ABSTRACT
A vehicle includes a determination unit, an authentication unit, a collector, an information generator, and a control processor. The determination unit determines whether multiple persons have been involved in an accident. The authentication unit performs vehicle-side possessor authentication to authenticate whether a portable device authenticated by portable device-side possessor authentication as is portable device owned by a driver. When the multiple persons have been involved in the accident and the portable device authenticated by the portable device-side possessor authentication corresponds to a portable device that is to send accident information to an emergency notification center, the collector collects information relevant to the accident from other vehicles involved in the accident. The information generator sorts out the information relevant to the accident to generate the accident information. The control processor causes the portable device authenticated by the portable device-side possessor authentication to send the accident information to the emergency notification center.

7 Claims, 6 Drawing Sheets

VEHICLE AND EMERGENCY NOTIFICATION SYSTEM

CROSS-REFERENCE TO RELATED APPLICATIONS

The present application claims priority from Japanese Patent Application No. 2022-143322 filed on Sep. 8, 2022, the entire contents of which are hereby incorporated by reference.

BACKGROUND

The disclosure relates to a vehicle and an emergency notification system.

Various notification systems to be applied to vehicles have been put into practical use. When an emergency such as a traffic accident or a malfunction of a vehicle occurs, a notification system causes a mobile phone, an in-vehicle phone, or another in-vehicle communication device to send an emergency notification indicating the state of the emergency via a mobile communication network.

An example of the notification system described above is disclosed in, for example, Japanese Unexamined Patent Application Publication (JP-A) No. 2010-244167. In order to inform an emergency center of details of a contact accident, an emergency notification system disclosed in JP-A 2010-244167 includes a pedestrian accident information sensor, an occupant accident information sensor, and an accident information transmission part. The pedestrian accident information sensor detects pedestrian accident information to determine a circumstance upon contact between a pedestrian and a vehicle. The occupant accident information sensor detects occupant accident information to determine a circumstance upon occurrence of danger to an occupant due to contact of the vehicle. When detecting contact with the pedestrian, the accident information transmission part sends the pedestrian accident information to a communication device of the emergency center. When determining the occurrence of danger to the occupant, the accident information transmission part sends the occupant accident information to the communication device.

SUMMARY

An aspect of the disclosure provides a vehicle including a determination unit, an authentication unit, a collector, an information generator, and a control processor. The determination unit is configured to determine whether multiple persons have been involved in an accident occurred. The authentication unit is configured to perform vehicle-side possessor authentication to authenticate whether a portable device authenticated by the portable device-side possessor authentication is a portable device owned by a driver who drives the vehicle. When the multiple persons have been involved in the accident and the portable device authenticated by the portable device-side possessor authentication corresponds to a portable device that is to send information on the accident to an emergency notification center, the collector is configured to collect information including personal data relevant to the accident from other vehicles involved in the accident. The information generator is configured to sort out the information including the personal data relevant to the accident and collected by the collector to generate the information on the accident to be sent to the emergency notification center. The control processor is configured to give to the portable device authenticated by the portable device-side possessor authentication an instruction to send the information on the accident generated by the information generator to the emergency notification center.

An aspect of the disclosure provides an emergency notification system including a vehicle, a portable device authenticated by portable device-side possessor authentication, and an emergency notification center. The vehicle includes a determination unit, a first authentication unit, a collector, an information generator, a control processor, a second authentication unit, a first transmitter, and a second transmitter. The determination unit is configured to determine whether multiple persons have been involved in an accident occurred. The first authentication unit is configured to perform vehicle-side possessor authentication to authenticate whether the portable device authenticated by portable device-side possessor authentication is a portable device owned by the driver. The collector is configured to collect information including personal data relevant to the accident from other vehicles involved in the accident when the multiple persons have been involved in the accident and the portable device authenticated by the portable device-side possessor authentication corresponds to a portable device that is to send information on the accident to the emergency notification center. The information generator is configured to sort out the information including the personal data relevant to the accident and collected by the collector to generate the information on the accident to be sent to the emergency notification center. The control processor configured to give the portable device authenticated by the portable device-side possessor authentication an instruction to send the information on the accident generated by the information generator to the emergency notification center. The portable device includes a second authentication unit, a first transmitter, and a second transmitter. The second authentication unit is configured to perform the portable device-side possessor authentication. The first transmitter is configured to send the information including the personal data relevant to the accident to the collector of the vehicle in response to a request from the vehicle to acquire the information including the personal data relevant to the accident. The second transmitter is configured to send the information on the accident generated by the information generator of the vehicle to the emergency notification center in accordance with the instruction from the control processor of the vehicle.

An aspect of the disclosure provides a vehicle including circuitry. The circuitry is configured to: determine whether multiple persons have been involved in an accident occurred; perform vehicle-side possessor authentication to authenticate whether a portable device authenticated by portable device-side possessor authentication is a portable device owned by a driver who drives the vehicle; collect information including personal data relevant to the accident from other vehicles involved in the accident when the multiple persons have been involved in the accident and the portable device authenticated by the portable device-side possessor authentication corresponds to a portable device that is to send information on the accident to an emergency notification center; sort out the information including the personal data relevant to the accident to generate the information on the accident to be sent to the emergency notification center; and give to the portable device authenticated by the portable device-side possessor authentication an instruction to send the information on the accident to the emergency notification center.

An aspect of the disclosure provides an emergency notification system including a vehicle, a portable device authenticated by portable device-side possessor authentication, and an emergency notification center. The vehicle includes first circuitry configured to: determine whether multiple persons have been involved in an accident occurred; perform vehicle-side possessor authentication to authenticate whether the portable device authenticated by portable device-side possessor authentication is a portable device owned by the driver; collect information including personal data relevant to the accident from other vehicles involved in the accident when the multiple persons have been involved in the accident and the portable device authenticated by the portable device-side possessor authentication corresponds to a portable device that is to send information on the accident to the emergency notification center; sort out the information including the personal data relevant to the accident to generate the information on the accident to be sent to the emergency notification center; and give the portable device authenticated by the portable device-side possessor authentication an instruction to send the information on the accident to the emergency notification center. The portable device includes second circuitry configured to: perform the portable device-side possessor authentication; send the information including the personal data relevant to the accident to the vehicle in response to a request from the vehicle to acquire the information including the personal data relevant to the accident; and send the information on the accident generated in the vehicle to the emergency notification center in accordance with the instruction from the vehicle.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
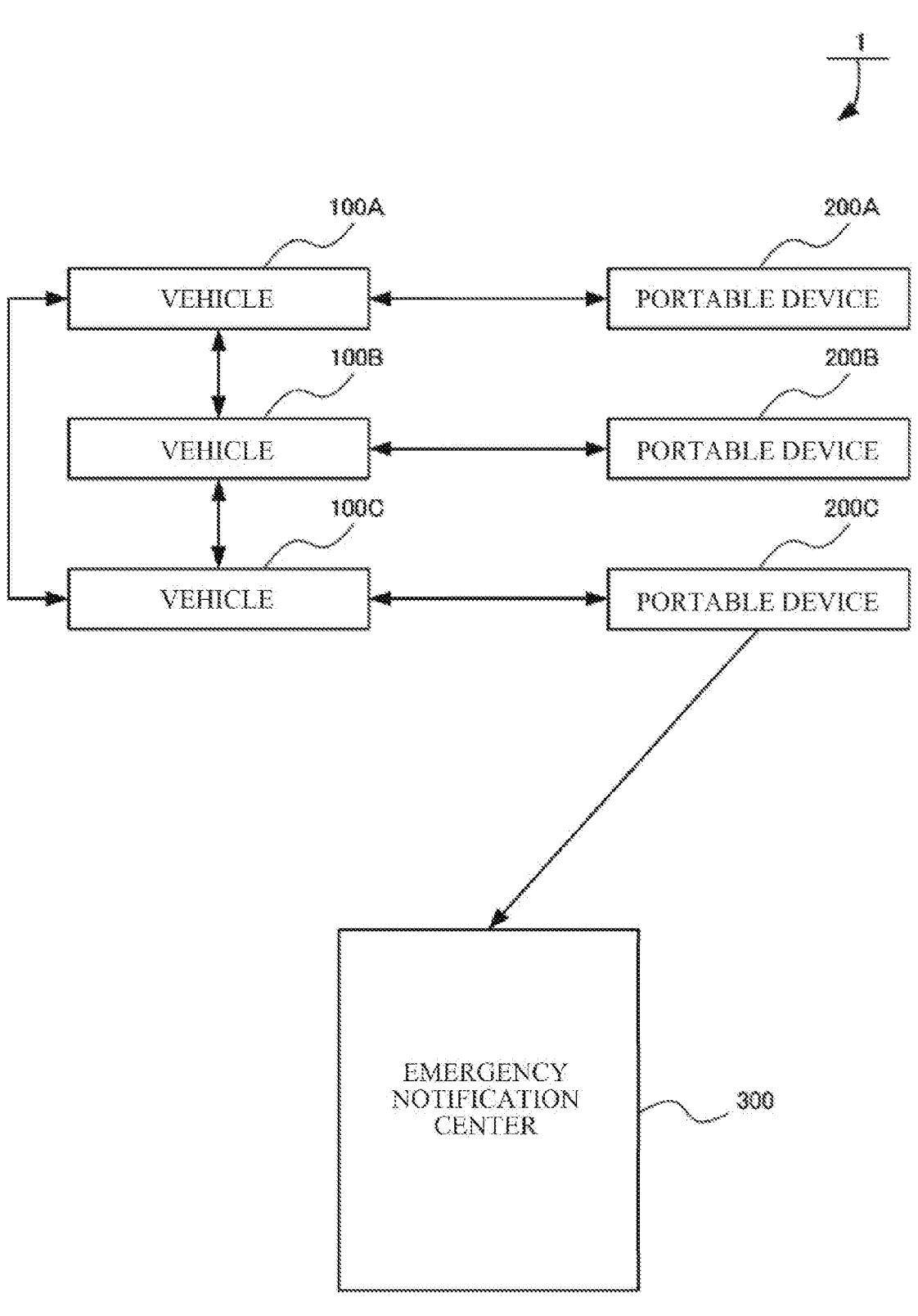
FIG. 1 is a block diagram illustrating a configuration of an emergency notification system according to one example embodiment of the disclosure.

As described in JP-A No. 2010-244167, when an accident involving vehicles occurs, information about details of the accident is to be provided to an emergency notification center.

When an accident involving multiple vehicles and multiple persons occurs, multiple pieces of information on the accident are sent from the multiple persons, including the person who has caused the accident, to the emergency notification center. The multiple pieces of information sent to the emergency notification center include information items similar to each other, which generates the necessity of a complicated process to distinguish the information at the emergency notification center. Further, when multiple pieces of information are sent from multiple devices or apparatuses at substantially the same time, a large processing load is imposed on a communication band. This can hinder prompt and accurate information transmission.

It is desirable to provide a vehicle and an emergency notification system each of which makes it possible to secure prompt and accurate information transmission upon the occurrence of an accident involving multiple persons.

EXAMPLE EMBODIMENTS

In the following, an emergency notification system according to an example embodiment of the disclosure is described with reference to FIGS. 1 to 6. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

<Configuration of Emergency Notification System 1>

As illustrated in FIG. 1, an emergency notification system 1 according to an example embodiment may include vehicles 100A, 100B, and 100C, portable devices 200A, 200B, and 200C, and an emergency notification center 300. Hereinafter, when there is no necessity to distinguish the vehicles 100A, 100B, and 100C from each other, the vehicles 100A, 100B, and 100C may be collectively referred to as vehicles 100 or may be each simply referred to as a vehicle 100. Hereinafter, when there is no necessity to distinguish the portable devices 200A, 200B, and 200C from each other, the portable devices 200A, 200B, and 200C may be collectively referred to as portable devices 200 or may be each simply referred to as a portable device 200.

The vehicles 100A, 100B, and 100C may be communicable with the respective portable devices 200A, 200B, and 200C owned by the drivers who drive the vehicles 100A, 100B, and 100C. Further, the vehicles 100A, 100B, and 100C may be communicable with each other via an intervehicular communication.

The vehicle 100 may be also communicable with other vehicles and other portable devices that are irrelevant to an accident concerned, as long as the other vehicles and the other portable devices are present in a specific communication area.

According to the present example embodiment, when an accident involving multiple persons occurs, the vehicles 100A, 100B, and 100C collect information on the accident by communicating with the respective portable devices 200A, 200B, and 200C owned by drivers or communicating with each other via the intervehicular communication.

Thereafter, one of the portable devices 200A, 200B, and 200C may be caused to send the collected information on the accident to the emergency notification center 300.

Authenticated as portable devices owned by the respective drivers of the vehicles 100A, 100B, and 100C by portable device-side possessor authentication and vehicle-side possessor authentication, the portable devices 200A, 200B, and 200C are allowed to communicate with the respective vehicles 100A, 100B, and 100C to exchange information therebetween.

Further, the portable devices 200A, 200B, and 200C may be each configured to send emergency notification information to the emergency notification center 300.

In one example, the emergency notification center 300 may include a server. The emergency notification center 300 may receive a notification from one of the portable devices 200A, 200B, and 200C, and may notify a person in charge in the facility provided with the server (i.e., the emergency notification center) of the information on the contact accident. When receiving the notification, the person in charge may send a notification to a fire station, a police station, or a hospital selected depending on the details of the accident.

<Configuration of Vehicle 100>

Figure 2:
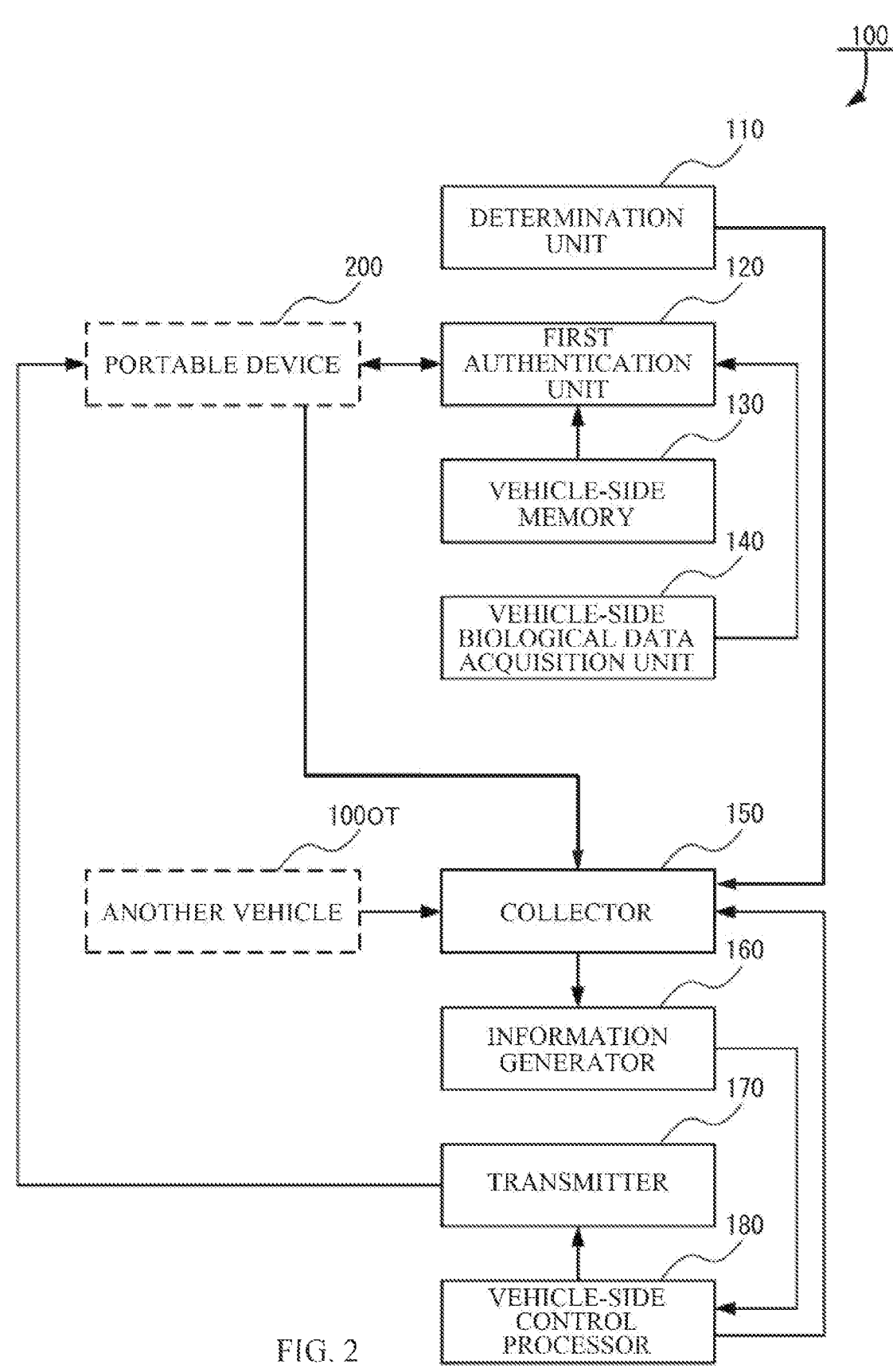
FIG. 2 is a block diagram illustrating a configuration of a vehicle according to one example embodiment of the disclosure.

As illustrated in FIG. 2, the vehicle 100 according to the present example embodiment includes a determination unit 110, a first authentication unit 120, a vehicle-side memory 130, a vehicle-side biological data acquisition unit 140, a collector 150, an information generator 160, a transmitter 170, and a vehicle-side control processor 180.

The determination unit 110 determines whether multiple persons have been involved in an accident occurred.

In one example, the determination unit 110 may determine whether multiple persons have been involved in an accident occurred, based on information acquired from the vehicles 100A, 100B, 100C involved in the accident, the portable devices 200A, 200B, and 200C owned by the occupants of the vehicles 100A, 100B, and 100C, and other portable devices present in a communicable peripheral area (the specific communication area).

For example, the determination unit 110 may determine whether multiple persons have been involved in the accident, based on image data acquired by the vehicles 100 or information on posts posted on social media or the like by the portable devices 200.

The first authentication unit 120 performs vehicle-side possessor authentication to authenticate whether the portable device 200 authenticated by the portable device-side possessor authentication is the portable device 200 owned by the drivers.

In one example, the first authentication unit 120 may perform the vehicle-side possessor authentication to authenticate whether the portable device 200 authenticated by the portable device-side possessor authentication is the portable device 200 owned by the driver, based on biological data of the driver acquired by the vehicle-side biological data acquisition unit 140 to be described later and identification (ID) data preliminarily stored in the vehicle-side memory 130 to be described later.

The vehicle-side memory 130 may preliminarily store the ID data of the portable device 200 owned by the driver. Note that the ID data of the portable device 200 may be ID data assigned by an in-vehicle device.

The vehicle-side biological data acquisition unit 140 may acquire the biological data of the driver.

In one example, the vehicle-side biological data acquisition unit 140 may acquire an image of the face of the driver obtained by analyzing a captured image, as the biological data.

Note that the biological data may be fingerprint data or iris data, for example.

In a case where the portable device 200 authenticated by the portable device-side possessor authentication corresponds to the portable device 200 that is to send the information on the accident to the emergency notification center 300, the collector 150 may collect information including personal data relevant to the accident from other vehicles 1000T involved in the accident.

In one example, the collector 150 may acquire information on the number of vehicles involved in the accident, the number of injured persons, the presence of fire, the states of breakage of vehicles, and a road condition from image data acquired by the other vehicles 1000T involved in the accident, and information on posts posted on social media or the like by the portable device 200 owned by the driver.

Note that the portable device 200 that is to send the information on the accident to the emergency notification center 300 may be selected from the portable devices 200A, 200B, and 200C by any method. For example, the ID data of the portable devices 200A, 200B, and 200C may be sorted in ascending order, and the portable device 200 ranked at a specific place may be determined as the portable device 200 that is to send the information on the accident to the emergency notification center 300.

The information generator 160 may sort out the information collected by the collector 150, which is the information including the personal data relevant to the accident, to thereby generate the information on the accident to be sent to the emergency notification center 300.

Herein, the term "sort out" may encompass deleting the same data in the information collected from the vehicles 100 or the portable devices 200 owned by the drivers of the vehicles 100, and combining multiple pieces of data in the information collected from the vehicles 100 or the portable devices 200 owned by the drivers of the vehicles 100, to thereby improve the accuracy of the information on the accident, such as the number of vehicles and the number of injured persons involved in the accident.

The transmitter 170 may receive a control signal for controlling the portable device 200 and the information on the accident generated by the information generator 160 from the vehicle-side control processor 180 to be described later. The transmitter 170 may then send the control signal and the information on the accident to the portable device 200 that is to send the information on the accident to the emergency notification center 300.

The vehicle-side control processor 180 may control an overall operation of the vehicle 100 in accordance with a control program stored in a non-illustrated read only memory (ROM), for example. In the present example embodiment, the vehicle-side control processor 180 may output such a control signal that causes one of the portable devices 200A, 200B, and 200C to send the information on the accident generated by the information generator 160 to the emergency notification center 300 via the transmitter 170.

<Configuration of Portable Device 200>

Figure 3:
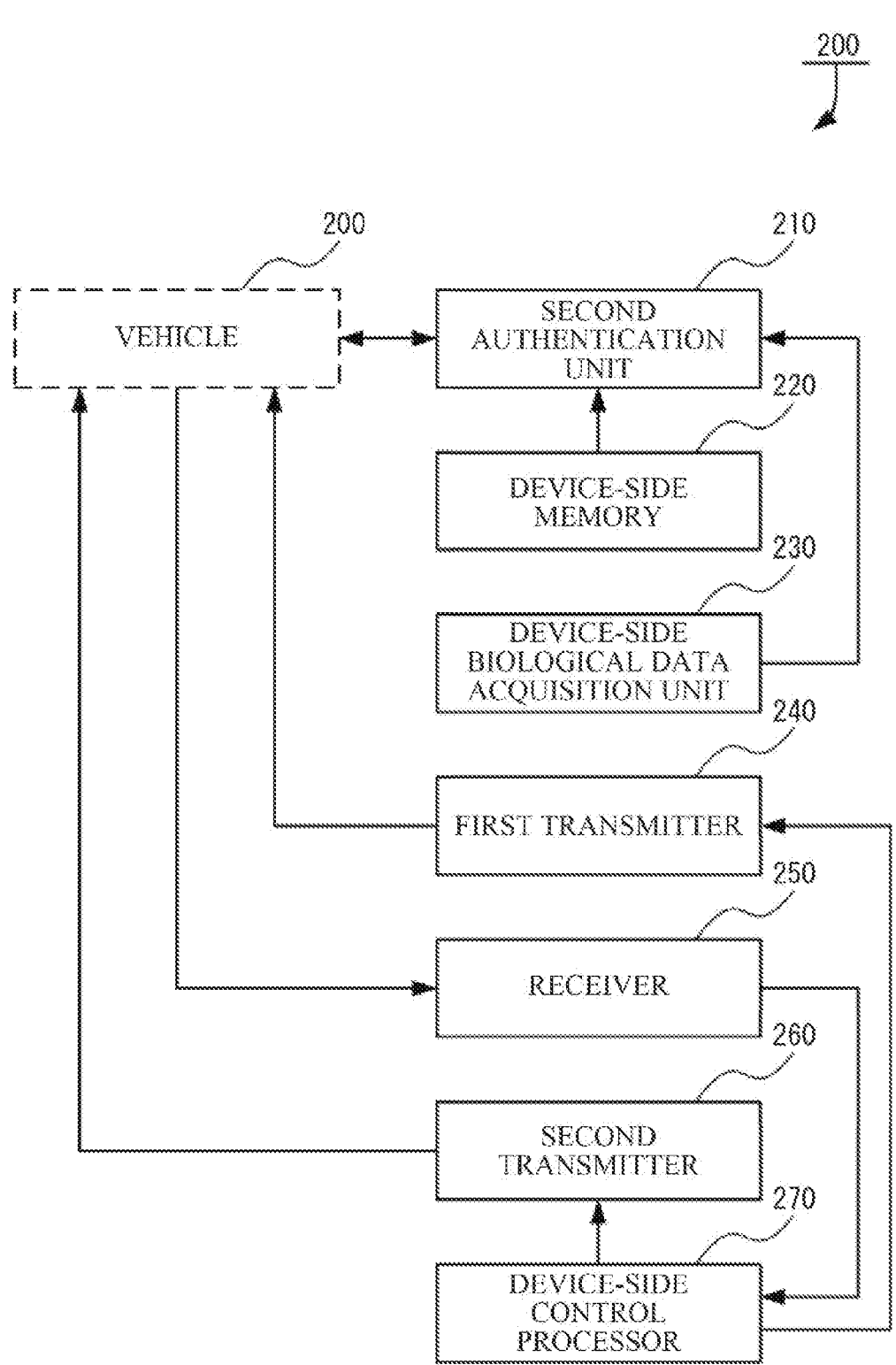
FIG. 3 is a block diagram illustrating a configuration of a portable device according to one example embodiment of the disclosure.

As illustrated in FIG. 3, the portable device 200 according to the present example embodiment may include a second authentication unit 210, a device-side memory 220, a device-side biological data acquisition unit 230, a first transmitter 240, a receiver 250, a second transmitter 260, and a device-side control processor 270.

The second authentication unit 210 may perform the portable device-side possessor authentication of the portable device 200.

In one example, the second authentication unit 210 may perform the portable device-side possessor authentication to authenticate whether the person owning the portable device 200 is a driver who drives the vehicle 100, based on biological data on the driver acquired from the device-side biological data acquisition unit 230 to be described later and ID data preliminarily stored in the device-side memory 220.

The device-side memory 220 may preliminarily store the ID data of the portable device 200. In one example, the ID data may be the same as that stored in the vehicle-side memory 130.

The device-side biological data acquisition unit 230 may acquire biological data of a person to be authenticated.

In one example, the device-side biological data acquisition unit 230 may acquire an image of the face of the person to be authenticated, as the biological data. The image of the face of the person to be authenticated may be obtained as a result of analyzing a captured image.

Note that the biological data may be fingerprint data or iris data, for example.

The first transmitter 240 may send the information including personal data relevant to an accident to the collector 150 of the vehicle 100 in response to a request from the vehicle 100 to acquire the information including the personal data relevant to the accident.

The receiver 250 may receive the information on the accident sent from the transmitter 170 of the vehicle 100 and the control signal, which causes the portable device 200 to send the information on the accident to the emergency notification center 300, outputted from the vehicle-side control processor 180 via the transmitter 170 of the vehicle 100.

Based on the instruction (i.e., the control signal) received from the vehicle 100, the second transmitter 260 may send the information on the accident generated by the information generator 160, which is the information including the personal data relevant to the accident, to the emergency notification center 300.

The device-side control processor 270 may control an overall operation of the portable device 200 based on a control program stored in a non-illustrated read on memory (ROM), for example. In the present example embodiment, when receiving the information on the accident to be sent to the emergency notification center 300 from the transmitter 170 of the vehicle 100 via the receiver 250, and the control signal that causes the portable device 200 to send the information on the accident to the emergency notification center 300 from the vehicle-side control processor 180 via the transmitter 170 of the vehicle 100, the device-side control processor 270 may cause the second transmitter 260 to send the information on the accident to the emergency notification center 300.

<Configuration of Emergency Notification Center 300>

Figure 4:
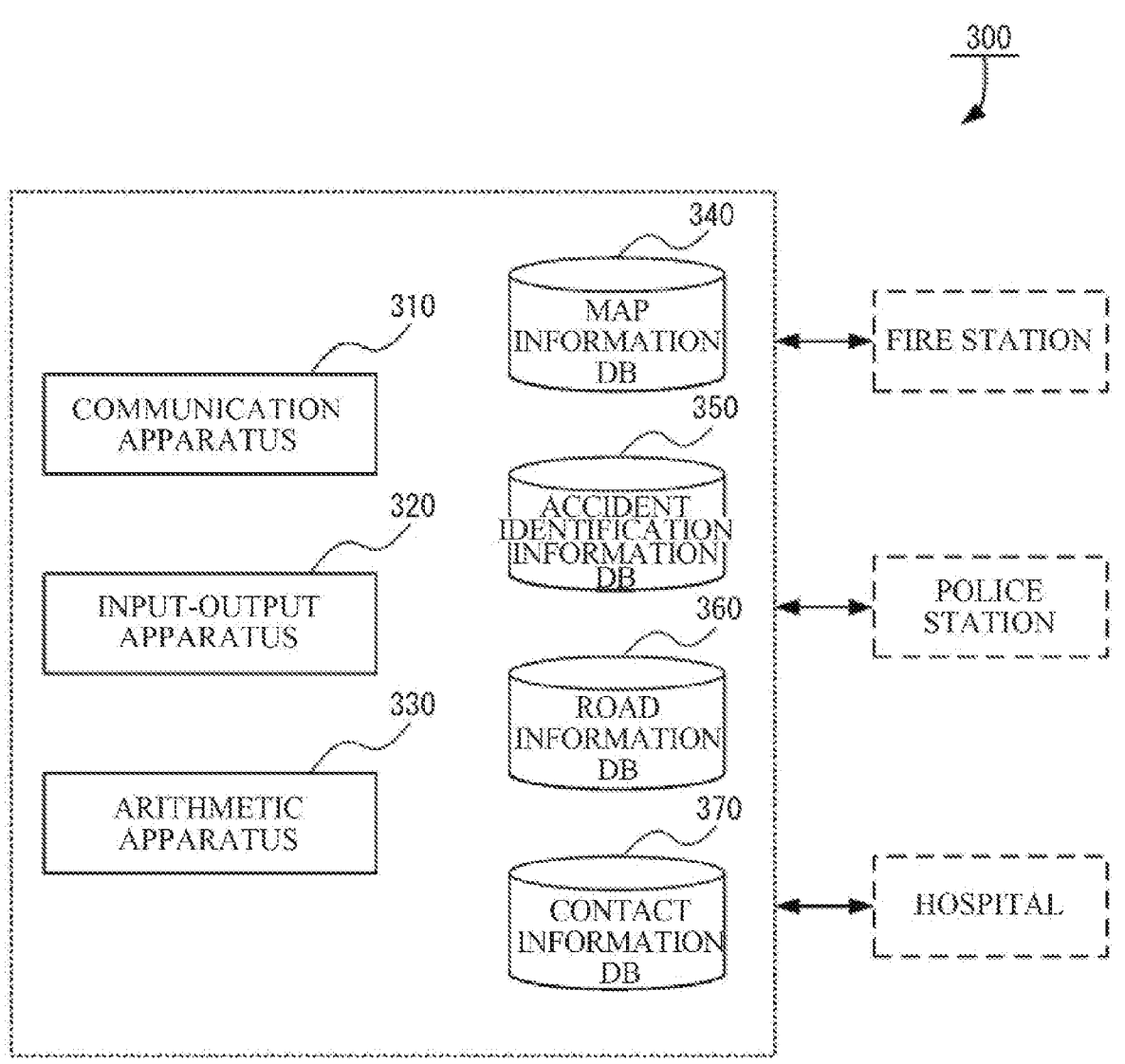
FIG. 4 is a block diagram illustrating a configuration of an emergency notification center according to one example embodiment of the disclosure.

As illustrated in FIG. 4, the emergency notification center 300 according to the present example embodiment may include the server including a communication apparatus 310, an input-output apparatus 320, an arithmetic apparatus 330, a map information database (DB) 340, an accident identification information database (DB) 350, a road information database (DB) 360, and a contact information database (DB) 370.

The communication apparatus 310 may be wirelessly communicable with the vehicles 100 and the portable devices 200. In one example, the communication apparatus 310 may receive emergency notifications from the portable devices 200.

The input-output apparatus 320 may be operated by a person in charge on the server side when data is inputted to the server or outputted from the server, for example. The input-output apparatus 320 may be a keyboard or a monitor, for example.

The arithmetic apparatus 330 may perform various calculations to control operations of various components in the server, for example.

The map information DB 340 may store map information. The map information DB 340 may be used when the arithmetic apparatus 330 identifies a current position of the portable device 200 based on a notification from the portable device 200, for example.

The accident identification information DB 350 may be an accumulation of data for identifying a specific circumstance of an accident. For example, the accident identification information DB 350 may store data on the relation between a vehicle speed V [km/h] and a contact energy E [J]. The accident identification information DB 350 may be used when specific details of an accident are to be identified based on sensor values of various sensors mounted in the vehicle 100, for example.

The road information DB 360 may be an accumulation of data on traffic congestion and road construction work. The road information DB 360 may be used when the arithmetic apparatus 330 is to provide one or more of a fire station, a police station, and a hospital with a route to the site of the accident, for example.

The contact information DB 370 may be an accumulation of contact information on facilities relevant to accidents, such as fire stations, police stations, and hospitals. The contact information DB 370 may be used when the person in charge in the emergency notification center 300 is to make contact with the facilities described above.

<Possessor Authentication Process Between Vehicle 100 and Portable Device 200>

Figure 5:
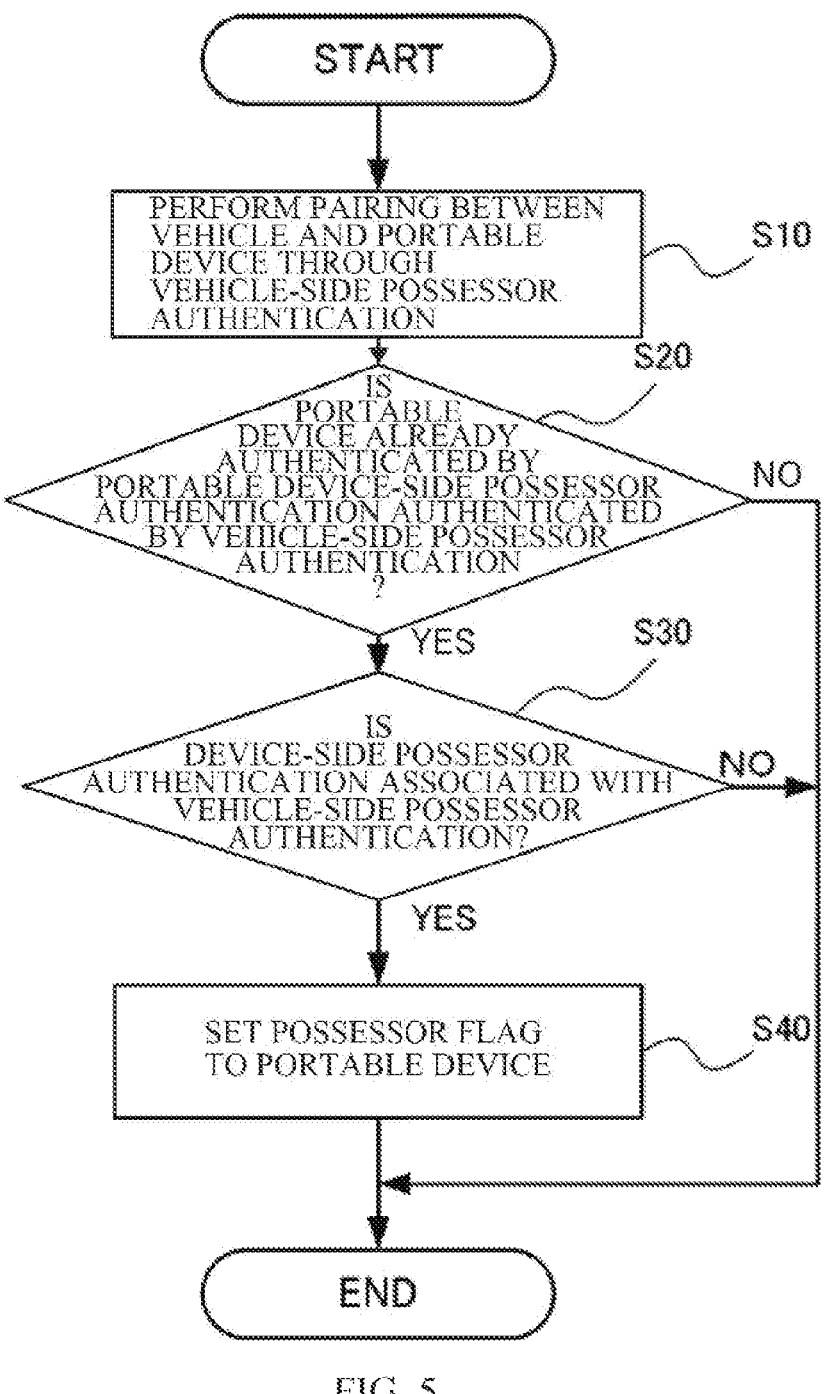
FIG. 5 is a flowchart of a process of vehicle-side possessor authentication between the vehicle and the portable device owned by the driver, according to the example embodiment of the disclosure.

With reference to FIG. 5, a description is given of an exemplary process of the possessor authentication between the vehicles 100A, 100B, and 100C and the respective portable devices 200A, 200B, and 200C according to the present example embodiment.

As illustrated in FIG. 5, the vehicle 100 and the portable device 200 may perform the possessor authentication between the vehicle 100 and the portable device 200 (Step S10).

The device-side control processor 270 of the portable device 200 may determine whether the portable device 200 already authenticated by the portable device-side possessor authentication is authenticated by the vehicle-side possessor authentication (Step S20).

If the device-side control processor 270 of the portable device 200 determines that the portable device 200 not authenticated by the portable device-side possessor authentication yet is authenticated by the vehicle-side possessor authentication (Step S20: NO), the process may end.

In contrast, the device-side control processor 270 of the portable device 200 determines that the portable device 200 already authenticated by the portable device-side possessor authentication is authenticated by the vehicle-side possessor authentication (Step S20: YES), the vehicle-side control processor 180 of the vehicle 100 may determine whether the vehicle-side possessor authentication at the vehicle 100 is associated with the portable device-side possessor authentication at the portable device 200 (Step S30). If the vehicle-side control processor 180 of the vehicle 100 determines that the vehicle-side possessor authentication at the vehicle 100 is not associated with the portable device-side possessor authentication at the portable device 200 (Step S30: NO), the process may end.

In contrast, if the vehicle-side control processor 180 of the vehicle 100 determines that the vehicle-side possessor authentication at the vehicle 100 is associated with the portable device-side possessor authentication at the portable device 200 (Step S30: YES), the vehicle-side control processor 180 may set a possessor flag to the portable device 200, following which the process may end.

<Process in Emergency Notification System 1>

An exemplary procedure of the process in the emergency notification system 1 according to the present example embodiment is described with reference to FIG. 6.

Figure 6:
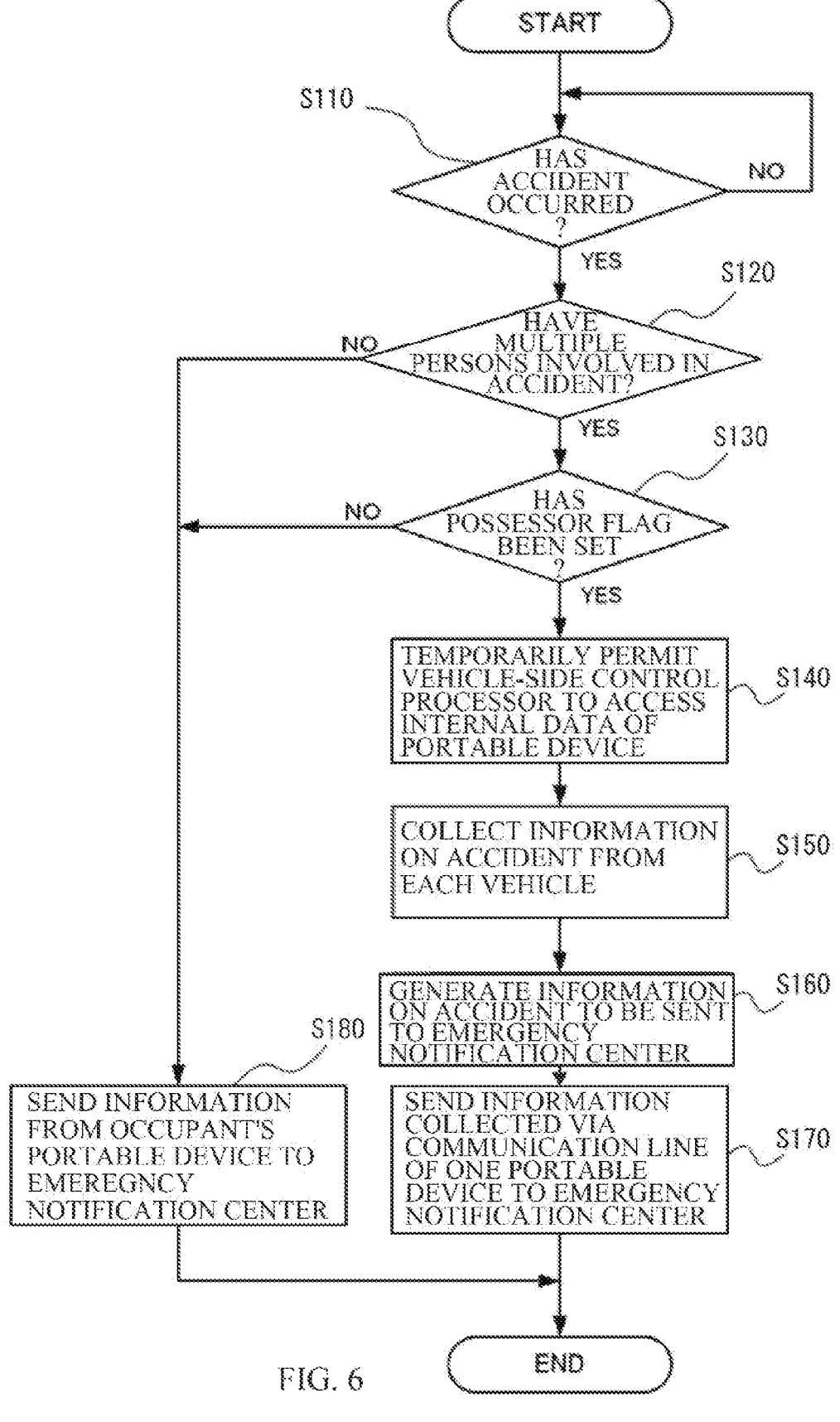
FIG. 6 is a flowchart of a process to be performed by an emergency notification system according to one example embodiment of the disclosure.

As illustrated in FIG. 6, the vehicle-side control processor 180 may determine whether an accident has occurred (Step S110). If the vehicle-side control processor 180 determines that no accident has occurred (Step S110: NO), the procedure may return to a stand-by mode.

In contrast, if the vehicle-side control processor 180 determines that an accident has occurred (Step S110: YES), the determination unit 110 may determine whether multiple persons have been involved in the accident (Step S120). If the determination unit 110 determines that multiple persons have not been involved in the accident (Step S120: NO), the portable device 200 of the driver or occupant involved in the accident may send information on the accident to the emergency notification center 300, following which the procedure may end.

In contrast, if the determination unit 110 determines that multiple persons have been involved in the accident (Step S120: YES), the device-side control processor 270 may determine whether the possessor flag has been set to the portable device 200 of the driver (Step S130). If the device-side control processor 270 determines that the possessor flag has not been set to the portable device 200 of the driver (Step S130: NO), the portable device 200 of the driver may be caused to send the information on the accident to the emergency notification center 300, following which the procedure may end.

In contrast, if the device-side control processor 270 determines that the possessor flag has been set to the portable device 200 of the driver (Step S130: YES), the vehicle-side control processor 180 may be temporarily permitted to access internal data of the portable device 200 of the driver (Step S140).

Thereafter, if the portable device 200 of the driver corresponds to the portable device 200 that is to send information on the accident to the emergency notification center 300, the collector 150 may collect the information including the personal data relevant to the accident from the other vehicles 1000T involved in the accident (Step S150).

The information generator 160 may sort out the information collected by the collector 150, which is the information including the personal data relevant to the accident, to thereby generate the information on the accident to be sent to the emergency notification center 300 (Step S160).

Thereafter, the vehicle-side control processor 180 may send such a control signal that causes the portable device 200 of the driver to send the information on the accident generated by the information generator 160 to the emergency notification center 300, to the portable device 200 via the transmitter 170. The portable device 200 of the driver may send the information on the accident generated by the information generator 160 to the emergency notification center 300, following which the procedure may end (Step S170).

Workings and Effects

As described above, when multiple persons have been involved in an accident, the first authentication unit 120 of the vehicle 100 in the emergency notification system 1 according to the present example embodiment authenticates the portable device 200 authenticated by the portable device-side possessor authentication as the portable device 200 owned by the driver.

Further, the vehicle 100 may include the vehicle-side memory 130 that preliminarily stores the ID data of the portable device owned by the driver, and the vehicle-side biological data acquisition unit 140 that acquires the biological data of the driver. The first authentication unit 120 may authenticate the portable device 200 authenticated by the portable device-side possessor authentication as the portable device 200 owned by the driver, based on the biological data of the driver acquired, and the ID data acquired from the portable device 200 authenticated by the portable device-side possessor authentication.

That is, the first authentication unit 120 may authenticate the portable device 200 that has been already authenticated as the portable device 200 owned by the driver through the portable device-side possessor authentication as the portable device 200 owned by the driver, based on the biological data of the driver acquired by the vehicle-side biological data acquisition unit 140 and the ID data stored in the vehicle-side memory 130.

Accordingly, even when the vehicle 100 acquires the information including the personal data relevant to the accident from the portable device 200, it is possible to avoid concerns about security of the personal data or the like.

Further, in a case where the portable device 200 authenticated by the portable device-side possessor authentication corresponds to the portable device 200 that is to send the information on the accident to the emergency notification center 300, the collector 150 collects the information including the personal data relevant to the accident from the other vehicles 1000T involved in the accident.

Accordingly, even when the vehicle 100 collects the information including the personal data relevant to the accident from the other vehicles 1000T involved in the accident, it is possible to avoid concerns about security of the personal data or the like. Further, it is possible to acquire a lot of information on the accident for recognizing details of the accident by collecting the information including the personal data relevant to the accident from the other vehicles 1000T involved in the accident.

Further, the information generator 160 sorts out the information including the personal data relevant to the accident to thereby generate the information on the accident to be sent to the emergency notification center 300.

That is, since the information collected by the collector 150 include a lot of data for recognizing the details of the accident, deleting the same data or combining some pieces of data helps to accurately recognize the number of vehicles involved in the accident and the number of injured persons, for example.

Accordingly, the information generator 160 sorts out the collected information including the personal data relevant to the accident, to thereby generate the information on the accident to be sent to the emergency notification center 300. This enables an optimal volume of accurate information to be sent to the emergency notification center 300.

Further, the vehicle-side control processor 180 causes one of the portable devices 200A, 200B, and 200C that is to send the information on the accident to the emergency notification center 300 to send the information on the accident to the emergency notification center 300.

When the multiple persons have been involved in the accident, multiple pieces of information are supposed to be sent from the multiple portable devices 200A, 200B, and 200C to the emergency notification center 300; however, according to the emergency notification system 1 of the present example embodiment, one of the portable devices 200A, 200B, and 200C is caused to send the information on the accident to the emergency notification center 300. This helps to reduce a processing load to be imposed on the communication band, securing prompt and accurate information transmission.

Further, the determination unit 110 of the vehicle 100 in the emergency notification system 1 according to the present example embodiment may determine that multiple persons have been involved in the accident, based on the information received from the portable devices 200 or other vehicles 1000T present in the communicable peripheral area. In one example, the determination unit 110 may determine that multiple persons have been involved in the accident, based on the image data acquired by the vehicles 100 or the information on posts posted on social media or the like by the portable devices 200.

Accordingly, it is possible to accurately and promptly determine whether multiple people have been involved in the accident.

Modification Example 1

Some limitations may be imposed by the portable device 200 on the information, including the personal data relevant to the accident, to be sent from the portable device 200 authenticated by the portable device-side possessor authentication. Further, some limitations may be imposed by the vehicle 100 on the information to be sent from the vehicle 100 to the other vehicle 1000T. Further, the portable device 200 authenticated by the portable device-side possessor authentication may impose some limitations on the information to be sent, by downloading a dedicated application in advance and allowing the vehicle 100 to receive the information via the dedicated application.

Modification Example 2

In the foregoing example embodiments, the portable device 200 that is to send the information on the accident to the emergency notification center 300 may be the portable device 200 ranked at a specific place when the ID data of the portable devices 200A, 200B, and 200C are sorted in ascending order. Alternatively, the specifications of the portable devices 200A, 200B, and 200C may be disclosed, and the portable device 200 with the highest specifications among the portable devices 200A, 200B, and 200C may be determined as the portable device 200 that is to send the information on the accident.

Note that it is possible to implement the emergency notification system 1 or the vehicle 100 of the example embodiments of the disclosure by recording the processes to be executed by, for example, the vehicle-side control processor 180 and the device-side control processor 270 on a non-transitory recording medium readable by a computer system, and causing, for example, the vehicle-side control processor 180 and the device-side control processor 270 to load the programs recorded on the non-transitory recording medium thereon to execute the programs. The computer system as used herein may encompass an operating system (OS) and hardware such as a peripheral device.

In addition, when the computer system utilizes a World Wide Web (WWW) system, the "computer system" may encompass a website providing environment (or a website displaying environment). The program may be transmitted from a computer system that contains the program in a storage device or the like to another computer system via a transmission medium or by a carrier wave in a transmission medium. The "transmission medium" that transmits the program may refer to a medium having a capability to transmit data, including a network (e.g., a communication network) such as the Internet and a communication link (e.g., a communication line) such as a telephone line.

Further, the program may be directed to implement a part of the operation described above. The program may be a so-called differential file (differential program) configured to implement the operation by a combination of a program already recorded on the computer system.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

One or more of the determination unit 110, the first authentication unit 120, the collector 150, the information generator 160, the vehicle-side control processor 180, the second authentication unit 210, the first transmitter 240, and the second transmitter 260, in FIGS. 2 and 3 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the determination unit 110, the first authentication unit 120, the collector 150, the information generator 160, the vehicle-side control processor 180, the second authentication unit 210, the first transmitter 240, and the second transmitter 260. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the determination unit 110, the first authentication unit 120, the collector 150, the information generator 160, the vehicle-side control processor 180, the second authentication unit 210, the first transmitter 240, and the second transmitter 260, in FIGS. 2 and 3.

13

The invention claimed is:

1. A vehicle, a driver of which has a portable device authenticated by portable device-side possessor authentication, the vehicle comprising:

a determination unit configured to determine whether multiple persons have been involved in an accident occurred;

an authentication unit configured to perform vehicle-side possessor authentication to authenticate whether the portable device authenticated by portable device-side possessor authentication is carried by the driver;

a collector configured to collect information including personal data relevant to the accident from other vehicles involved in the accident when the multiple persons have been involved in the accident and the portable device authenticated by the portable device-side possessor authentication is to send information on the accident to an emergency notification center;

an information generator configured to sort out the information including the personal data relevant to the accident and collected by the collector to generate the information on the accident to be sent to the emergency notification center; and a control processor configured to convey to the portable device authenticated by the portable device-side possessor authentication an instruction to send the information on the accident generated by the information generator to the emergency notification center.

2. The vehicle according to claim 1, further comprising:

a memory preliminarily storing identification data of the portable device carried by the driver; and a biological data acquisition unit configured to acquire biological data of the driver, wherein the authentication unit is configured to perform the vehicle-side possessor authentication based on the biological data of the driver acquired by the biological data acquisition unit and the identification data stored in the memory.

3. The vehicle according to claim 2, wherein the determination unit is configured to determine whether the multiple persons have been involved in the accident, based on information acquired from multiple portable devices and multiple vehicles in a communicable peripheral area, the multiple portable devices including the portable device, the multiple vehicles including the vehicle.

4. The vehicle according to claim 1, wherein the determination unit is configured to determine whether the multiple persons have been involved in the accident, based on information acquired from multiple portable devices and multiple vehicles in a communicable peripheral area, the multiple portable devices including the portable device, the multiple vehicles including the vehicle.

5. An emergency notification system comprising:

a vehicle;

a portable device authenticated by portable device-side possessor authentication; and an emergency notification center, wherein the vehicle comprises a determination unit configured to determine whether multiple persons have been involved in an accident occurred, a first authentication unit configured to perform vehicle-side possessor authentication to authenticate whether the portable device authenticated by the portable device-side possessor authentication is carried by a driver of the vehicle,

a collector configured to collect information including personal data relevant to the accident from other vehicles involved in the accident when the multiple persons have been involved in the accident and the portable device authenticated by the portable device-side possessor authentication is to send information on the accident to the emergency notification center, an information generator configured to sort out the information including the personal data relevant to the accident and collected by the collector to generate the information on the accident to be sent to the emergency notification center, and a control processor configured to convey the portable device authenticated by the portable device-side possessor authentication an instruction to send the information on the accident generated by the information generator to the emergency notification center, and the portable device authenticated by portable device-side possessor authentication comprises a second authentication unit configured to perform the portable device-side possessor authentication, a first transmitter configured to send the information including the personal data relevant to the accident to the collector of the vehicle in response to a request from the vehicle to acquire the information including the personal data relevant to the accident, and a second transmitter configured to send the information on the accident generated by the information generator of the vehicle to an emergency notification center in accordance with the instruction from the control processor of the vehicle.

6. A vehicle, a driver of which has a portable device authenticated by portable device-side possessor authentication, the vehicle comprising circuitry configured to:

determine whether multiple persons have been involved in an accident occurred;

perform vehicle-side possessor authentication to authenticate whether the portable device authenticated by portable device-side possessor authentication is carried by a driver who drives the vehicle;

collect information including personal data relevant to the accident from other vehicles involved in the accident when the multiple persons have been involved in the accident and the portable device authenticated by the portable device-side possessor authentication corresponds to a portable device that is to send information on the accident to an emergency notification center;

sort out the information including the personal data relevant to the accident to generate the information on the accident to be sent to the emergency notification center; and give to the portable device authenticated by the portable device-side possessor authentication an instruction to send the information on the accident to the emergency notification center.

7. An emergency notification system comprising:

a vehicle;

a portable device authenticated by portable device-side possessor authentication; and an emergency notification center, wherein the vehicle comprises first circuitry configured to:

determine whether multiple persons have been involved in an accident occurred;

perform vehicle-side possessor authentication to whether authenticate the portable device authenticated by portable device-side possessor authentication is carried by a driver of the vehicle;

collect information including personal data relevant to the accident from other vehicles involved in the accident when the multiple persons have been involved in the accident and the portable device authenticated by the portable device-side possessor authentication is to send information on the accident to the emergency notification center;

sort out the information including the personal data relevant to the accident to generate the information on the accident to be sent to the emergency notification center; and convey the portable device authenticated by the portable device-side possessor authentication an instruction to send the information on the accident to the emergency notification center, and the portable device authenticated by portable device-side possessor authentication comprises second circuitry configured to:

perform the portable device-side possessor authentication;

send the information including the personal data relevant to the accident to the vehicle in response to a request from the vehicle to acquire the information including the personal data relevant to the accident; and send the information on the accident generated in the vehicle to an emergency notification center in accordance with the instruction from the vehicle.

\* \* \* \* \*